United States Patent [19]

Bauer et al.

[11] Patent Number: 4,656,926
[45] Date of Patent: Apr. 14, 1987

[54] VENTILATION CONTROL UNIT FOR MOTOR VEHICLES

[75] Inventors: Karl-Heinz Bauer, Bad Neustadt; Reinhold Moret, Mellrichstadt, both of Fed. Rep. of Germany

[73] Assignee: Preh Elektrofeinmechanische Werke Jakob Preh, Nachf. GmbH & Co., Bad Neustadt, Fed. Rep. of Germany

[21] Appl. No.: 759,944

[22] Filed: Jul. 29, 1985

[30] Foreign Application Priority Data

Aug. 1, 1984 [DE] Fed. Rep. of Germany ....... 3428331
Sep. 19, 1984 [DE] Fed. Rep. of Germany ....... 3434302

[51] Int. Cl.⁴ .............................................. B60H 1/24
[52] U.S. Cl. ......................................... 98/2; 74/54; 74/89.13; 74/471 R; 74/501 R; 74/507; 251/248; 251/250.5; 251/294; 340/815.31
[58] Field of Search ................... 74/89.13, 54, 471 R, 74/501.6, 417, 507; 98/2, 2.05, 2.08, 2.11; 251/248, 249.5, 294, 250; 340/815.31; 116/202

[56] References Cited

U.S. PATENT DOCUMENTS 3,118,321  1/1964  Rinke ............................. 74/89.13 X
3,136,525  6/1964  Creasser ....................... 251/250.5 X

FOREIGN PATENT DOCUMENTS 1129388  5/1962  Fed. Rep. of Germany .
2405321  8/1975  Fed. Rep. of Germany .
2721497  11/1977 Fed. Rep. of Germany .
3104482  8/1982  Fed. Rep. of Germany .
3136672  3/1983  Fed. Rep. of Germany .

*Primary Examiner*—Harold Joyce
*Attorney, Agent, or Firm*—Woodcock Washburn Kurtz Mackiewicz & Norris

[57] ABSTRACT

A control unit for setting heating, air conditioning and/or ventilation in motor vehicles is provided. The control unit comprises a body adaptable for insertion into the instrument panel of a motor vehicle, said body having a front panel and a rear carrier member. At least one control knob, by means of which a driving bevel gear connected with it drives at least one driven bevel gear, is rotatably mounted in the front panel. An elongated adjusting lever which swings over a limited range cooperates with the driven bevel to actuate a Bowden cable, which in turn is capable of controlling heating, air conditioning or ventilation systems, particularly flaps in the system which control air flow.

19 Claims, 6 Drawing Figures

VENTILATION CONTROL UNIT FOR MOTOR VEHICLES

BACKGROUND OF THE INVENTION

The present invention pertains to a control unit for setting heating, air conditioning, and/or ventilation in motor vehicles, and particularly to such a unit that can be inserted into the instrument panel or dashboard of the vehicle.

Such control units, which can be installed in the instrument panel of a motor vehicle, are used, among other things, for opening the distributor flaps of outlets for cool or warm air to varying extents as desired. They are controlled usually via so-called Bowden cables.

A control unit for opening and closing the air control flaps of heating and air conditioning units of motor vehicles is described in German patent publication No. 1,129,388, in which there is disclosed two adjusting levers which are movable in slots provided in the instrument panel. The degree of ventilation and heat is set by means of the adjusting levers, while the flow of heating medium to the heat exchanger is controlled with a control knob. The first adjusting lever, which controls the fresh air supply, receives a larger portion of the fresh air only after the adjusting lever of the zone flap has been shifted by a considerable extent. The amount of fresh air decreases considerably when the adjusting lever controlling the fresh air supply is shifted over the first half of its regulating range. The second adjusting lever is used to control the top and bottom vents in the interior of the automobile. Therefore, starting from the closed position, the control flaps perform a progressively increasing opening movement. This is achieved in that the adjusting lever is provided with leg ends with different lengths. The adjusting lever is movable by means of an oblong slot through which a fixed pin extends in the direction of the longitudinal axis of the oblong slot. The lever is also rotatable around the pin at the same time. A Bowden cable is attached to the short end of the leg. This end of the adjusting level describes a curve in the form of a parabola. The other adjusting lever also operates the flap with a slightly progressively increasing opening path.

Another mechanism for adjusting several functions of an air conditioner in a motor vehicle by means of a single adjusting lever is known from German patent publication No. 27 21 497. A T-shaped adjusting lever reaches through an adjusting slot and the two lateral legs are linked in two axes of rotation on two knuckle arms. Each of these knuckle arms is linked around a fixed axis of rotation. In addition, a guide groove is provided in each knuckle arm for adjusting a control lever. These control levers are in turn pivoted around fixed axes of rotation. They are adjusted by guiding one cross pin each, attached to the control lever in the guide grooves. Bowden cables are attached to the free ends of the control levers.

Another device for controlling Bowden cables by means of a control knob, in which a flexible pulling and pressing member is arranged in a casing, is disclosed in German patent publication No. 24 05 321. This member is located on a cylindrical disk pivoted in the casing, which disk is connected with the control knob via a carrier. One end of the member is attached to the disk, while a Bowden cable is attached to the other end. In addition, the member is guided in a travel-limiting tube. This tube can be arranged in such a way that the Bowden cable is led away from the casing in an angular or arc-shaped pattern. It is also possible to actuate a plurality of flexible pulling and pressing members with the same control knob. The corresponding cylindrical disks have different diameters, so that different adjustment path lengths can be obtained.

A control knob for controlling a Bowden cable is provided in the control unit according to German patent publication No. 31 04 482. The Bowden cable is connected to a disk or drum via a flexible pulling and pressing member. Over part of its circumference, the drum has a toothed rim whose teeth mesh with the teeth of the member.

According to the latter two disclosures, the Bowden cables being actuated are led away in tangential direction relative to the disk or drum. However, there are also cases in which the Bowden cables must run parallel to the axis of rotation of the control knob. One mechanism to affect this is shown in German patent publication No. 31 36 672. A threaded drum is rotated by the control knob. Parallel to the drum is a double guide. A slide which meshes with the thread of the drum via a sliding pin is carried during the rotation of the drum and slides on the guide. The threads may have uniform or different pitches. A fastening means for the Bowden cable is provided as the sliding pin proper.

A control unit is also known which uses bevel gears to actuate Bowden cables. A control knob is rotatably mounted on the front panel of a body. A first bevel gear is connected with the control knob. Behind the front panel is located a rear carrier member in the form of a frame. A two-armed, one-piece, flat and plate-shaped lever is rotatably mounted in this frame; one arm of this lever has a circular segment on one side whose teeth mesh with the teeth of the first bevel gear and thus acts as a second bevel gear. A Bowden cable is attached to the free end of the other arm. Since the lever is a one-piece lever, only linear movement of the Bowden cable is possible. In addition, it is not possible to make the control knob continuously rotatable.

The objective of the present invention is to provide a control unit of the type described in the introduction using simple means in such a way that one or more Bowden cables, extending parallel to the direction of the axis of rotation of the control knob, can be actuated with one control knob with either limited or unlimited turning range, the Bowden cables having both linear and nonlinear adjustment paths which are independent of each other.

SUMMARY OF THE INVENTION

There is provided by the present invention, a control unit for setting heating, air conditioning, or ventilation in motor vehicles that can be placed in the instrument panel of the motor vehicle. The control unit comprises a body having a front panel and a substantially flat rear carrier member attached substantially perpendicularly thereto; at least one control knob rotatably mounted on one side of the front panel; at least one driving bevel gear associated with said at least one control knob and rotatably mounted on the opposite side of said first panel such that rotation of said control knob causes rotation of said associated driving bevel gear; at least one driven bevel gear rotatably mounted on said body and associated with said at least one driving bevel gear and capable of being driven therby, the axis of rotation of said driven bevel gear being substantially perpendicular to the axis of rotation of said associated driving bevel gear; an elongate adjusting lever pivotally mounted at one end thereof to said body and cooperating with said driven bevel gear and capable of being pivoted thereby through an angular range, the pivot axis of said lever being spaced from the axis of rotation of said driven bevel gear; a Bowden cable attached to the other end of said adjusting lever and capable of being actuated thereby to transmit motion; and guide means associated with said driven bevel gear and said cooperating adjusting lever for determining the movement of said lever in respone to rotation of said driven bevel gear; wherein each driving bevel gear has at least one driven bevel gear associated therewith, and each driven bevel gear has at least one adjusting lever cooperating therewith.

The control unit can be easily adapted to desired control requirements because the necessary changes need be made only in the second bevel gear. In addition, the invention provides a mechanism to display the position of the control knob by a thermometer scale-like illumination. Furthermore, regardless of the travel of the Bowden cable, its angular deflection can be kept at a small value. Since the lever is relatively long, transmission of stronger forces is also possible.

DETAILED DESCRIPTION OF THE INVENTION

Figure 1:
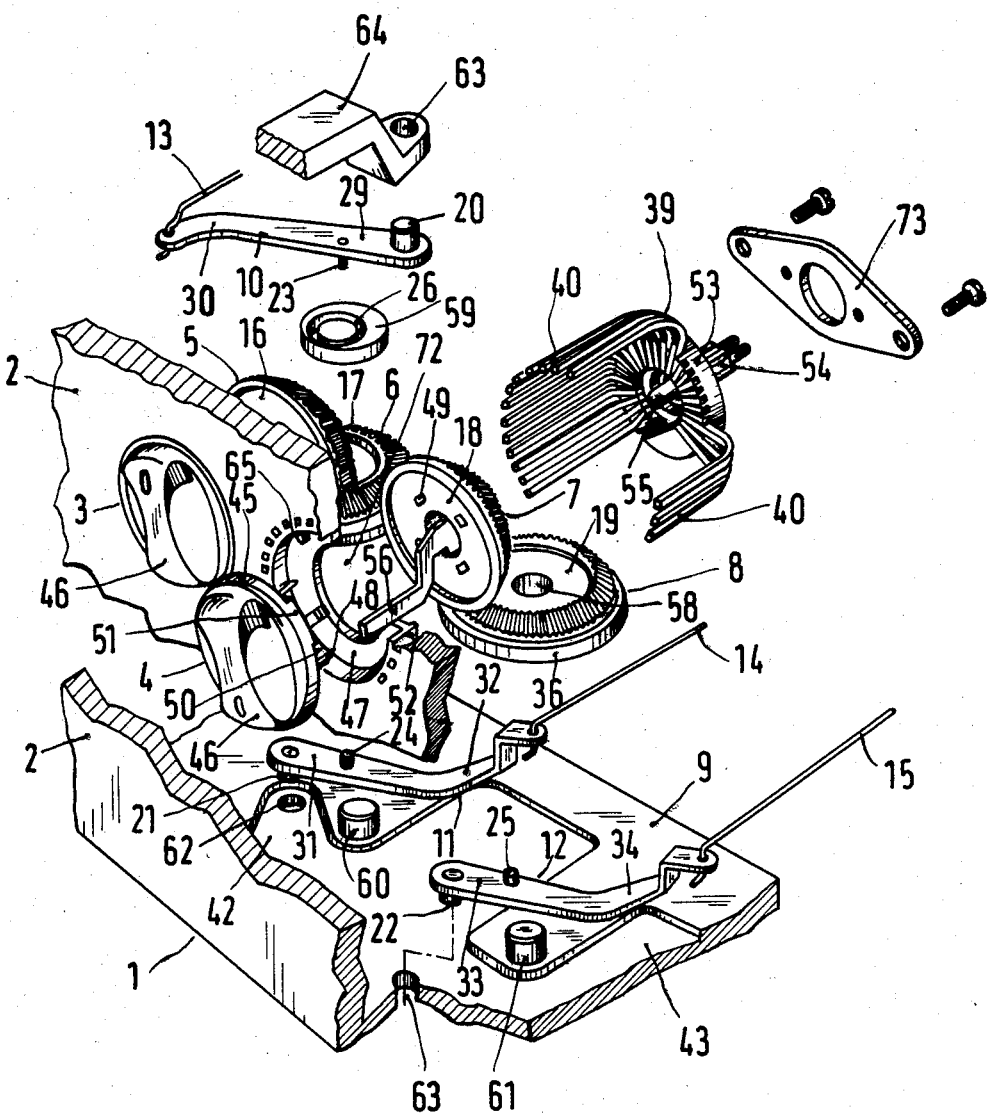
FIG. 1 shows the frontal and lateral perspective views of a control unit in a partial cutaway.

Designated by 1 in FIG. 1 is the body of a control unit which serves for setting heating, air conditioning and/or ventilation in motor vehicles, where the body 1 can be inserted in an instrument panel (not shown in FIG. 1) and fastened with screws. This control unit consists of a body 1 of L-shaped cross section made from plastic with a front panel 2 and a carrier member 9 arranged at approximately right angles to it. The front panel and the carrier member are expediently made of one piece.

A plurality of control knobs 3, 4 are rotatably mounted in the front panel 2, two such control knobs being shown in the Figures. A single control knob is possible, but a unit having two or more is preferred. Each control knob 3, 4 consists of a disk-shaped base part 45 to which a handle 46 extending nearly over the entire diameter is attached. A circular recess 47 is provided in the front panel 2 to receive the base part 45 of the control knob. The depth of the recess 47 is preferably adapted to the thickness of the base part 45 so that only the handle 46 projects from the surface of the front panel 2.

Figure 2:
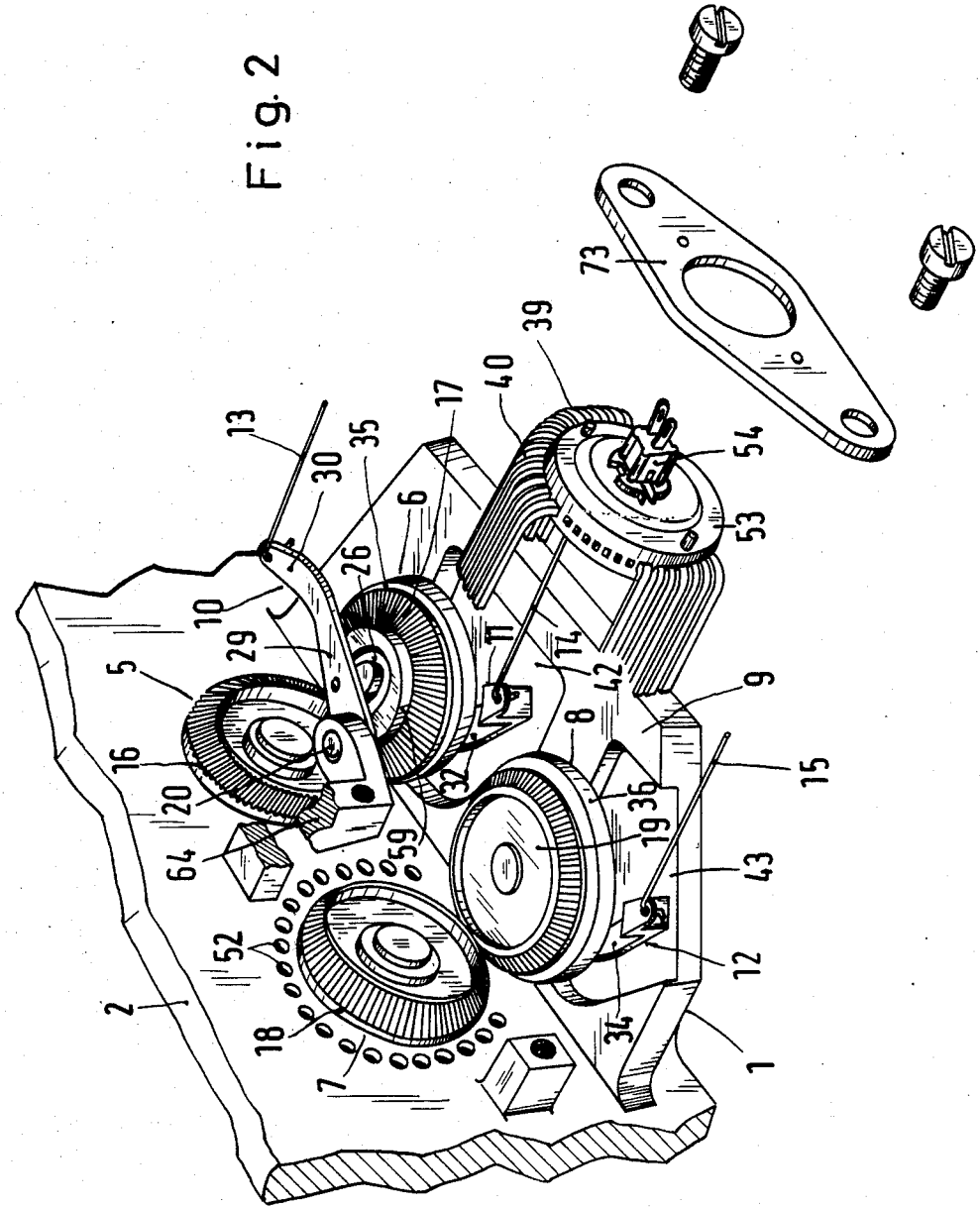
FIG. 2 is the rear perspective view of the control unit.
Figure 3:
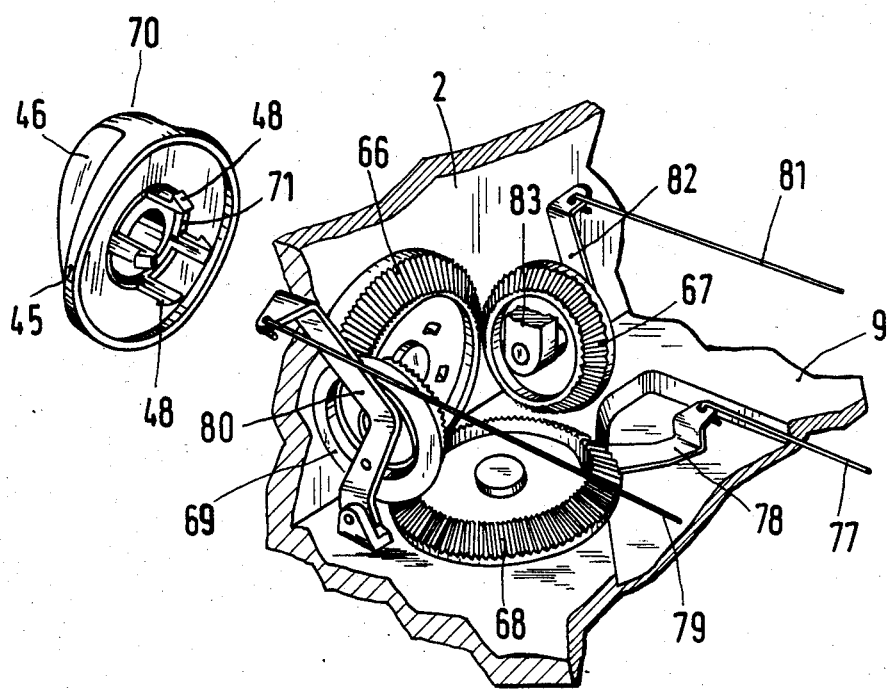
FIG. 3 is the rear perspective view of another control unit.

On the side opposite the handle 46 of each knob, there are attached four snap-in clasps 48 distributed evenly over the circumference of the base part 45, which cooperate with recesses 49 in the driving bevel gears 5 and 7 to form a snap-in connection. As shown, a driving bevel gear is associated with each control knob. The snap-in clasps 48 are attached to a ring projection 71, as shown in FIG. 3, positioned concentrically within base part 45 to provide it with the same axis of rotation as the control knob 3. In FIGS. 1-3, the control knobs (3, 4 or 70) are rotatable in the recess of the front plate with this ring projection.

As is apparent from FIG. 1, a projecting, attached nose 65, which serves as a stop for the control knob 4, is located in the recess 47. This nose 65 reaches into a ring-shaped opening 50 extending circumferentially at the edge of the base part 45. The opening is interrupted only by a web or shoulder 51. The length of the web is determined by the desired range of rotation of the control knob. The nose 65 may be omitted if the control knob is to be capable of continuous rotation.

Control knob 4 can be equipped, as shown, with a position indicator mechanism as further shown in FIGS. 1 and 2. The position of the control knob is displayed by a thermometer scale-like indicator which consists of a plurality of single light guides 40 arranged circularly around the control knob 4, whose ends are visible through openings 52 of the front panel 2. The arcuate length of the bundle consisting of individual light guides is dependent on the desired range of rotation.

The individual light guides 40 originate from a luminous center 39 attached to the back side of the front panel 2 by a shackle 73 by means of screws. The luminous center 39 consists of a guide socket 53 preferably made from plastic in which the individual light guides 40 are held. A lamp socket 54, into which a light source 55 can be inserted, is secured within the socket 53. The light from light source 55 also falls upon a light guide 56 which is, of course, also made of a light-guiding material. Bent several times, this light guide is led through the bevel gear 7 and through the base part 45 of the control knob 4 and to the handle, its end being visible through a slot provided in the handle. With the thermometer scale-like display band, light guide 56 provides further indication of the position of control knob 4. It would also be possible to lead another light guide from the luminous center 39 to the handle of the control knob 3 in a similar manner but without scale-like display.

A bevel gear drive which consists of at least two bevel gears; a driving gear and a driven gear cooperating with each other, is driven with each control knob. As is apparent from FIG. 1, the axes of rotation of the gears are at right angles to each other. Directly connected to control knobs 3 and 4 are driving bevel gears 5 and 7, respectively, which are on the back side of the front panel 2. The driven bevel gears 6 and 8 which are pivoted on carrier member 9 are driven by bevel gears 5 and 7. Gears 6 and 8 ride on pivots 60 and 61 which are attached to the carrier member and which reach into openings 57 and 58 of the driven bevel gears 6 and 8.

Figure 5:
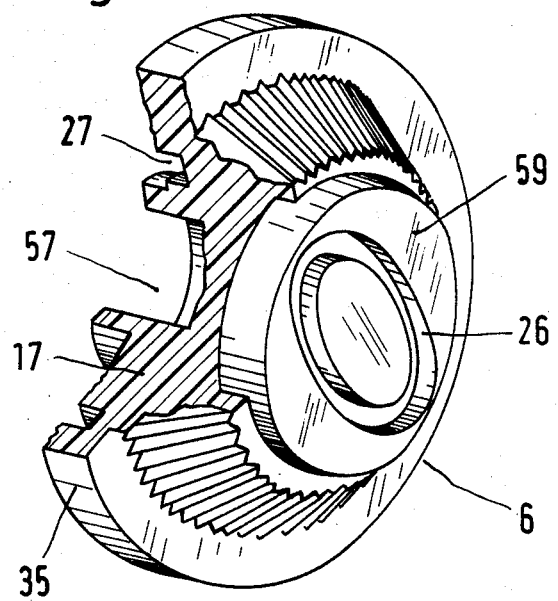
FIG. 5 is the perspective view of another driven bevel gear.

As shown in FIG. 5, the bevel gear 6 itself consists of the actual gear body 17 which has the toothed rim on its circumference. On the relatively flat under-side on which the gear body lies on the carrier member, the gear body has a disk-shaped projection 35 which is either molded on or can be inserted as an accessory into the gear body. A closed, guide groove 27 is cut in this projection 35. The shape of the guide groove is determined by the distance which the corresponding Bowden cable 14, shown in FIGS. 1 and 2, is to travel during the rotation of the control knob 3. The path of the cable can be linear or nonlinear, depending on the shape of the guide groove. Since the guide groove is closed in itself (that is, it is a closed, continuous loop), the control knob can be rotated continuously. The Bowden cable 14 is attached to an adjusting lever 11 which is moved in correspondence with movement of gear 6 through guide pin 24 which fits into guide groove 27.

Adjusting lever 11 consists of two connected sections, 31 and 32, which enclose an obtuse angle with each other. Alternatively, the two sections can be substantially perpendicular to each other. The guide pin 24 is disposed in the first section 31. On the opposite side of this section is provided a pivot 21 which reaches into a hole 62 in the carrier member. This is the pivot bearing for the adjusting lever 11. Bowden cable 14 is attached to the opposite end of the adjusting lever 11 in the second section 32. It is possible to operate, e.g., a fan flap with this Bowden cable.

As is apparent from FIG. 2, another Bowden cable 13 is moved by another adjusting lever 10, which is also actuated by driven bevel gear 6 through control knob 3. An insert 59, which can be inserted in or molded into the gear body 17, is provided for this purpose on the side of the gear body 17 opposite the projection 35. A guide groove 26, which is closed in itself, is cut out in this insert. The guide groove 26 has such a shape that a linear or nonlinear movement of the Bowden cable 13 is generated. Guide grooves 26 and 27 can be identical in shape or they can have different curved shapes. However, both should be closed in themselves in order for the control knob 3 to be continuously rotatable. As shown in FIG. 5, the guide grooves are each spaced at radially differing distances from the axis of rotation of bevel gear 6. That is, the radius of curvature of the groove varies along its curved length.

The adjusting lever 10 is guided by its attached guide pin 23 which reaches into guide groove 26. The adjusting lever 10 consists of two sections 29 and 30 connected with each other at an obtuse angle. On the side of the first section 29 opposite to the guide pin 23 there is provided an attached pivot 20 which is rotatably inserted into a hole 63 of a bracket 64. This bracket 64 is mounted or attached in one piece on the back side of the front panel 2. A Bowden cable 13 is attached to the free end of the second section 30.

Figure 6:
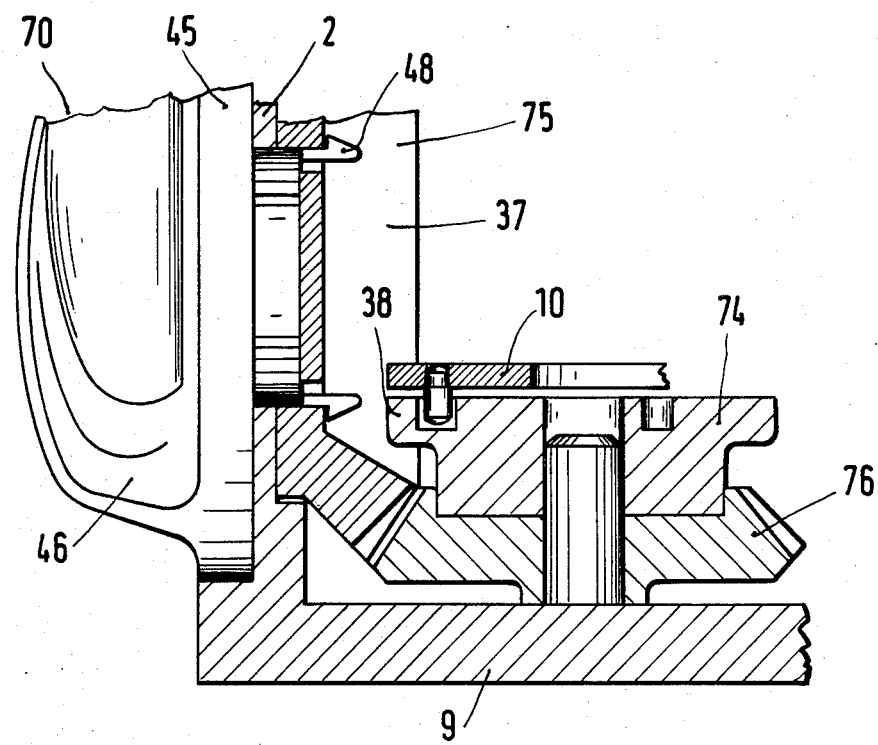
FIG. 6 is the lateral sectional view of another control unit in a partial cutaway.

As is apparent from FIG. 1, the guide groove 26 of the insert 59 is within the toothed rim of the gear body 17, leading to a relatively narrow swing or angular range of lever 10. However, if a wider swing of the adjusting lever 10 is desirable, an insert 74 could be provided with a tip 38 projecting from the toothed rim, as is shown in FIG. 6, which tip reaches into a recess 37 in the driving bevel gear. The embodiment shown in FIG. 6 is discussed in more detail below. It is also apparent from FIG. 1 that the axes of rotation of the adjusting levers 10 and 11 are is spaced from the axis of rotation of the bevel gear 6.

With reference to FIG. 2, the carrier member 9 is provided with two recesses 42 and 43 which pass over into each other. The depth of these recesses is selected to be such that the adjusting levers 11 and 12 are able to freely move in them. The driven bevel gears 6 and 8 lie on the carrier member with their corresponding projections 35 and 36 disposed within and partially covering the recesses 42 and 43.

Figure 4:
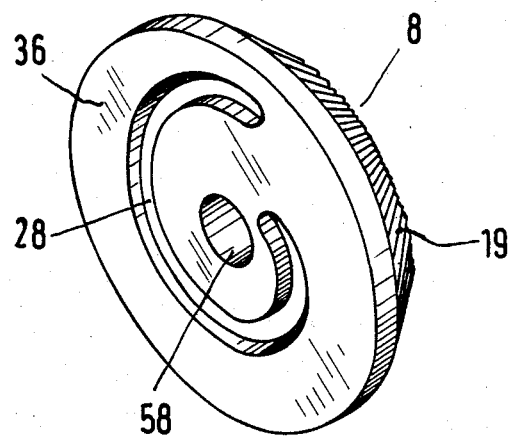
FIG. 4 is the perspective view of a driven bevel gear.

While the control knob 3 is continuously rotatable, the control knob 4 has a stop, as was already mentioned, in the form of a nose 65 which fits in the opening 50 of the base part 45. Corresponding to the stop, the guide groove 28 in bevel gear 8 is not closed in itself but has a limited length, as shown in FIG. 4. The guide groove shown in FIG. 4 has a shape that imparts a nonlinear course to the corresponding Bowden cable 15; that is, the radius of curvature varies along the curved length of the groove. When the radius of curvature is constant, a linear course is imparted to the Bowden cable.

As is also apparent from FIG. 4, the gear body 19 has a centric opening 58. The pivot 61 which is attached to or inserted into the carrier member 9 reaches into this opening 58. This pivot forms the pivot bearing for the driven bevel gear 8.

The guide pin 25 which is attached or, more simply, molded to the third adjusting lever 12 is guided in the guide groove 28. On the side of the adjusting lever opposite the guide pin there is provided a pivot 22 which reaches into a slot 63 which is located in the carrier body 9 in such a way that the adjusting lever is rotatable around it.

Like the adjusting levers 10 and 11, the third adjusting lever 12 consists of two major sections, the first section 33 and the second section 34, which enclose an obtuse angle with each other, as is illustrated in FIG. 1. A Bowden cable 15 is attached to the free end of the second section 34. The pivot 22 and the guide pin 25 are spaced from each other but are both on the first section 33 of the adjusting lever 12. It is also apparent from FIG. 1 that the axis of rotation of each adjusting lever is spaced from the axis of rotation of the bevel gear to which it corresponds.

Another embodiment of the present invention is shown in FIG. 6. In order to achieve a wider swing or angular range of the adjusting lever 10, the insert 74 in the driven bevel gear 7 has a tip 38 projecting from the toothed rim of the gear. This tip 38 reaches into a recess 37 of the driving bevel gear 75. The teeth of this bevel gear 75 mesh with the teeth of the driven bevel gear 76. The insert 74 can also be connected with the bevel gear 76 in one piece; that is, not as an insert at all but as an integral part of the gear itself. As is apparent from FIG. 6, the control knob 70 is attached to the front panel 2 in this embodiment, as well as in those earlier described, by snap-in clasps 48.

In the above-described embodiments, a single driving bevel gear actuates a single driven bevel gear, each such driven gear carrying up to two Bowden cables. It is thus possible to move up to two Bowden cables within certain limits, independent of each other. If more than two Bowden cables are to be controlled, however, more bevel gears must be used. An example of such an embodiment is shown in FIG. 3 which is intended to be exemplary, but no limiting, of all possible embodiments of such multi-gear actuation. In FIG. 3, there is a front panel 2 as well as a carrier member 9. The driving gear 66 is rotated by the control knob 70. A driven bevel gear 68 is rotatably mounted on the carrier member in the manner already described. One or two Bowden cables can be moved by means of this bevel gear 68, although as an example, only one Bowden cable 77 is shown in FIG. 3 along with the corresponding adjusting lever 78. Furthermore, there are provided two more driven bevel gears 67 and 69, whose axes of rotation are parallel to each other but at right angles to the axes of rotation of the two other bevel gears. The adjusting lever 82 to which the Bowden cable 81 is attached is moved with the bevel gear 67. The bevel gear 69 moves the adjusting lever 80 to which the Bowden cable 79 is attached in the same manner. The pivot bearings for the adjusting levers 80 and 82 are located below on the carrier member, while the pivot bearing for the bevel gear 67 is provided on a bracket 83. The bevel gear 69 is also rotatable in the same manner as is gear 67. Similar to bracket 64 of the first embodiment, bracket 83 is also attached to the back side of the front panel 2. The control knob 70 is preferably continuously rotatable, because a control knob with a stop would also limit the travel of all Bowden cables.

We claim:

1. A control unit for setting heating, air conditioning, or ventilation in motor vehicles that can be inserted in the instrument panel of the motor vehicle, the control unit comprising:
    a body having a front panel and a substantially flat rear carrier member attached substantially perpendicularly thereto;
    at least one control knob rotatably mounted on one side of the front panel;
    at least one driving bevel gear associated with said at least one control knob and rotatably mounted on the opposite side of said front panel such that rotation of said control knob causes rotation of said associated driving bevel gear;
    at least one driven bevel gear rotatably mounted on said body and associated with said at least one driving bevel gear and capable of being driven therby, the axis of rotation of said driven bevel gear being substantially perpendicular to the axis of rotation of said associated driving bevel gear;
    an elongate adjusting lever pivotally mounted at one end thereof to said body and cooperating with said driven bevel gear and capable of being pivoted thereby through an angular range, the pivot axis of said cooperating lever being spaced for the axis of rotation of said driven bevel gear;
    a Bowden cable attached to the other end of said adjusting lever and capable of being actuated thereby to transmit motion; and
    guide means associated with said driven bevel gear and said cooperating adjusting lever for determining the movement of said lever in respone to rotation of said driven bevel gear;
    wherein each driving bevel gear has at least one driven bevel gear associated therewith, and each driven bevel gear has at least one adjusting lever cooperating therewith.

2. A control unit of claim 1 wherein said adjusting lever has at least two sections which are perpendicular or at an obtuse angle to each other.

3. A control unit of claim 1 wherein said guide means comprises a guide pin attached to said adjusting lever and a guide groove in said driven bevel gear said guide pin fitting into said groove and being adapted to slide therein.

4. A control unit of claim 3 wherein said guide groove is a closed loop and wherein the radial distance from the axis of rotation of said driven bevel gear to said groove varies along the length of said groove.

5. A control unit of claim 3 wherein said guide groove is open and is provided with a stop at each end.

6. A control unit of claim 3 wherein at least one driven bevel gear has a disc-shaped projection on the side opposite the side at which said driven gear is mounted, said guide groove being disposed within said disc-shaped projection.

7. A control unit of claim 6 wherein said driving bevel gear has a recess into which is extended an edge of said disc-shaped projection of said associated driven bevel gear.

8. A control unit of claim 1 further comprising a plurality of elongated light guides, said light guides originating at one end from a luminous center and extending therefrom such that said light guides substantially surround the circumference of said driving bevel gear and such that the other ends of said light guides are arranged in a substantially circular pattern around said control knob and are visible in said front panel except in the area where said driving bevel gear associates with said driven bevel gear.

9. A control unit of claim 1 wherein at least one driven bevel gear is mounted on said rear carrier member, and wherein said member has a recess within which said adjusting lever cooperating with said driven bevel gear mounted on said rear carrier member pivotally moves.

10. A control unit of claim 3 wherein at least one driven bevel gear is mounted on said rear carrier member, and wherein said member has a recess within which said adjusting lever cooperating with said driven bevel gear mounted on said rear carrier member pivotally moves.

11. A control unit of claim 4 wherein at least one driven bevel gear is mounted on said rear carrier member, and wherein said member has a recess within which said adjusting lever cooperating with said driven bevel gear mounted on said rear carrier member pivotally moves.

12. A control unit of claim 8 wherein at least one driven bevel gear is mounted on said rear carrier member, and wherein said member has a recess within which said adjusting lever cooperating with said driven bevel gear mounted on said rear carrier member pivotally moves.

13. A control unit of claim 6 wherein said adjusting lever that cooperates with said driven bevel gear having said disc-shaped projection is mounted in a bracket on the back side.

14. A control unit of claim 7 wherein said adjusting lever that cooperates with said driven bevel gear having said disc-shaped projection is mounted in a bracket on the back side of said front panel.

15. A control unit of claim 1 wherein at least one driving bevel gear has a plurality of driven bevel gears associated therewith.

16. A control unit of claim 3 wherein at least one driving bevel gear has a plurality of driven bevel gears associated therewith.

17. A control unit of claim 4 wherein at least one driving bevel gear has a plurality of driven bevel gears associated therewith.

18. A control unit of claim 9 wherein at least one driving bevel gear has a plurality of driven bevel gears associated therewith.

19. A control unit of claim 15 having three driven bevel gears associated with said at least one driving bevel gear, one of said three driven gears being mounted directly on said rear carrier member and the other two of said three driven gears being mounted to said body such that their axes of rotation are parallel to each other and perpendicular to the axis of rotation of said first of said three driven gears.

* * * * *